United States Patent [19]

McCaskey, Jr. et al.

[11] 4,061,823
[45] Dec. 6, 1977

[54] HIGHLY MACHINABLE COTTON-PHENOLIC BASE FOR DECORATIVE ASSEMBLIES

[75] Inventors: Harold O. McCaskey, Jr., Allendale, S.C.; Salvatore E. Palazzolo, Elizabeth City, N.C.

[73] Assignee: Westinghouse Electric Corporation, Pittsburgh, Pa.

[21] Appl. No.: 639,956

[22] Filed: Dec. 11, 1975

[51] Int. Cl.$^2$ .............................................. B32B 5/02
[52] U.S. Cl. .................................... 428/318; 428/282; 428/326; 428/530; 428/528; 428/531; 428/172; 428/535
[58] Field of Search ............... 428/172, 531, 530, 528, 428/282, 326, 318, 535

[56] References Cited

U.S. PATENT DOCUMENTS

| | | | |
|---|---|---|---|
| 2,314,701 | 3/1943 | Harvey | 428/531 |
| 3,013,916 | 12/1961 | Boiney et al. | 428/286 |
| 3,318,760 | 5/1967 | Boenig et al. | 428/530 |
| 3,373,070 | 3/1968 | Fuerst | 428/530 X |
| 3,558,395 | 1/1971 | Plegat | 428/318 X |
| 3,767,517 | 10/1973 | Williams | 428/531 X |
| 3,940,538 | 2/1976 | Palazzolo et al. | 428/318 |
| 3,946,137 | 3/1976 | Power et al. | 428/530 X |

*Primary Examiner*—P. C. Ives
*Attorney, Agent, or Firm*—D. P. Cillo

[57] ABSTRACT

A highly machinable, shapeable decorative laminate is made from a non-abrasive base core consisting of a plurality of sheets, each sheet consisting essentially of cotton linter fibers in paper form containing a curd phenolic resin, the core having superimposed thereon a print sheet impregnated with a cured thermoset resin.

4 Claims, 1 Drawing Figure

U.S. Patent      Dec. 6, 1977      4,061,823
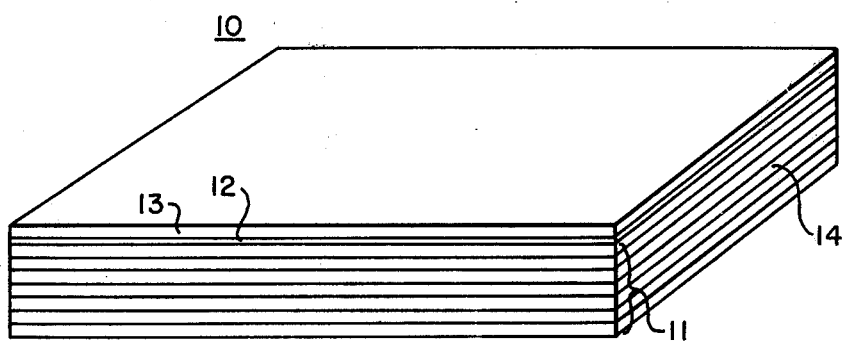

HIGHLY MACHINABLE COTTON-PHENOLIC BASE FOR DECORATIVE ASSEMBLIES

BACKGROUND OF THE INVENTION

High-pressure decorative laminates have been widely employed in the building industry as counter and furniture tops. Because they are resistant to scratching and various liquids and heat, the high-pressure decorative laminates have been popular in the furniture industry, where they not only provide an attractive appearance matching adjacent natural wood finishes, but also a surface more durable than wood.

In the production of such counter and furniture tops, particularly the latter, it is necessary to cut or otherwise machine the top to the desired dimensions and configuration. This may be accomplished by simultaneously machining a stack of laminates which are thereafter individually bonded to a rigid structural base member to form a furniture assembly, or by first bonding a laminate sheet to a rigid base member of substantial thickness and then machining the composite assembly. Irrespective of the method, the laminate must be machine cut to form rounded corners etc.

The hard durable surface provided by the laminate is relatively difficult to machine, and tungsten carbide-tipped tools are frequently employed to reduce tool wear and minimize the down-time involved in sharpening tools. Machinability and tool wear are, accordingly, particularly important factors in the use of high-pressure decorative laminates for counter and furniture tops.

One solution to the problem of tool wear is described by Palazzolo and McCaskey in U.S. Pat. No. 3,940,538. There, a high yield, saturable, wood fiber core paper was produced containing at least 65% hardwood fibers, containing 8 to 15% total lignin content. Up to 35% softwood fibers could be present, but with softwood lignin contents not greater than 2.8%.

Applicants have discovered that the use of random felted cotton linter fiber paper, as a complete substitute for wood fiber paper, provides even further improvement in terms of non-abrasiveness and tool wear.

Cotton batting, unwoven webbing and fabric have been suggested as a phenolic resin impregnated core material for various types of high pressure decorative and electrical grade laminates by Dickey, in U.S. Pat. No. 1,352,436, Hickler, in U.S. Pat. No. 2,456,006 and Boiney et al, in U.S. Pat. No. 3,013,916, respectively. None of these patents, however, have dealt with or solved problems of laminate machining, or recognized that random felted cotton linter fiber paper can be a complete non-abrasive substitute for wood fiber paper, to improve the machinability of high pressure decorative laminates.

SUMMARY OF THE INVENTION

A highly machinable, i.e., cutable, shaveable and shapeable decorative laminate is made by heat and pressure consolidating: (1) a non-abrasive base core, having the property of being highly cutable, shaveable and shapeable, consisting of a plurality of sheets made from felted cotton linter fibers in paper form, the core sheets being impregnated with cured phenolic resin, (2) a superimposed decorative print sheet, impregnated with a cured thermoset resin, and preferably (3) a superimposed protective overlay sheet, impregnated with a cured thermoset resin.

BRIEF DESCRIPTION OF THE DRAWING

For a better understanding of the invention, reference may be made to the preferred embodiment, shown in the accompanying drawing of a laminate made in accordance with this invention.

DESCRIPTION OF THE PREFERRED EMBODIMENTS

Referring now to the figure, a laminate 10 comprises a lay up of a plurality of resin impregnated core sheets 11, a superimposed resin impregnated decorative print sheet 12 and a protective overlay sheet 13. Heat and pressure are applied to this lay up to consolidate the materials into a unitary decorative structure. One edge surface is shown as 14.

The overlay sheet is preferably a thin sheet of high grade alpha cellulose or regenerated cellulose paper which has been impregnated with a thermosetting resin, such as a melamine formaldehyde resin or other amino triazine aldehyde resins, urea formaldehyde, resins, thiourea formaldehyde resins, unsaturated polyester resins and the like. In selecting the resin for the overlay sheet, it is generally preferred to utilize the same resin or substantially the same quality of resin which has been used to impregnate the print sheet. The overlay sheet is not a necessary part of the laminating assembly although it is generally used. It is transparent when cured and protects the decorative layer.

The print sheet usually provides the decorative effect for the laminate. It is usually in the form of a decorative sheet, i.e. dyed, pigmented to impart a solid color or printed with a design, such as a wood or marble grain. It usually comprises a single sheet of high grade absorbent alpha cellulose or regenerated cellulose paper impegnated with a substantially completely cured amino trizaine aldehyde resin, usually a thermoset melamine formaldehyde resin.

The non-abrasive, highly machinable rigidity-imparting core stock layer is made of a plurality of sheets consisting essentially of cotton linter fiber paper containing phenolic resin. Cotton "linters" are the short hair, fuzz, seed fibers which adhere to the cottonseed boll when the staple cotton "lint" or textile fibers are ginned from the seed. These linters are removed in the seed-cleaning operation since they are generally too short to be of value in textiles. After ginning, the cottonseed boll is put through a linter machine having close saw settings to remove the linters from the seed. Cotton linters are composed of about 94 to 96% cellulose, 1.3% to 1.9% protein, 0.9% to 1.2% pectin, 1.2 to 1.6% ash, 0.6 to 1.0% wax and 0.8 to 1.0% organic acids. The linter fibers have a long, tubular, twisted corkscrew form and produce a soft, flexible, bulky paper. In the process of papermaking, the fibers are torn and shredded and the twist is made less prominent.

The cotton linters are extensively used for chemical purposes, especially for the manufacture of cellulose acetate and cellulose nitrate. In cotton linters, a thin layer of pectins and wax surrounds the linter cell wall. The cotton linters are cooked by an alkaline process, generally in 2% caustic soda solution containing about 0.2% of a soap-forming substance, at about 15 lb. to 30 lb. pressure, to remove wax and pectin, which together constitute about 2 wt.% of the linters. This provides a material that is almost pure cellulose, virtually free from lignin. The linters can then be beaten, bleached, washed and supplied to the chemical industry in the form of pulp sheets of linter fibers.

Cotton linters have lengths ranging from about 5 mm. (millimeters) to about 40 mm., with an average length of about 18 mm., and with diameters ranging from about 0.010 mm. to about 0.040 mm. Kraft paper fibers are generally longer, about 30 to 40 mm. and generally much thicker, about 2 to 4 mm. in diameter. It is thought that the thinness of the cotton linter fibers contributes to non-abrasiveness and machinability. The linter fibers are more brittle than wood fibers and the cellulose in linters have a higher mean molecular weight compared with cellulose from wood, approximately D.P. 8,000 and 2,000 respectively.

The cotton linter fiber paper will be bulky and soft, and unlike kraft paper, will generally be pure fiber, containing substantially no lignin, chemical impurity constituents or abrasive components. It will generally be as absorbent as standard saturating grade kraft paper and almost as strong, so that it will provide a satisfactory laminated product. The cotton linter fiber paper should have a thickness of between about 0.010 inch (0.0254 cm.) to about 0.025 inch (0.0636 cm.) to provide the best porosity, flexibility and toughness properties. The cotton linter fiber paper will be made using standard aqueous slurry paper making techniques well known in the art, where an aqueous slurry of cotton liners is fed from a headbox and laid down on a moving, endless wire belt of a Fourdronier Machine, to form a random matted or random felted sheet material in paper non-woven form.

The major portion of the paper in a decorative laminate is composed of the core sheets rather than the print or overlay sheets. Typically, 7 or 8 core sheets are consolidated with only a single print and single overlay sheet to form a conventional 1/16 inch decorative laminate. Therefore, the core composition will be the major factor influencing abrasiveness and machinability of the laminate, and will also be an important factor regarding machinability of an assembly with a decorative laminate top.

By "highly machinable, non-abrasive, highly shapeable core or sheet" is meant: that a core layer for use in laminates, or sheets for use in a core layer will be effective to allow shaving or cutting or can be shaved or cut for at least 500 cycles per 1¼' of edge surface, using a standard 90.0 Rockwell A hardness carbide tip shaper blade, without dulling, or cratering the carbide tip, i.e., causing a curved indentation in the carbide tip where it cuts the sheets of the core. The Rockwell Hardness A scale is well known, and is described in the *Metals Handbook*, 8th ed., Vol. 1, 1961, at pp. 31 and 1234, as a hardness scale based on the depth of penetration of a specified penetrator into a specimen at a particular load, here a brale penetrator at a 60 kg. load.

The amino triazine aldehyde resins used to impregnate the overlay and print sheets are well known in the art, and reference may be made to U.S. Pat. No. 3,392,092 for exhaustive details on their production. Similarly, complete details on the phenolic resins used to impregnate the core sheet can be found in U.S. Pat. Nos. 2,205,427; 2,315,087; 2,328,592 and 2,383,430.

The overlay sheet, print sheet and core sheets are impregnated using standard techniques. The print sheet will be impregnated with a solution of amino triazine aldehyde resin to give a resin content between 30 and 75 percent by weight, based on the total dry weight of the impregnated sheet, and then dried to a stage where the volatile content is between 2 and 10 percent. The core layer sheets are impregnated with a solution of phenolic resin to give a resin content of between about 25 and 45 percent by weight, based on the total dry weight of the impregnated sheet, and then dried to a stage at which the resin is only partly cured and has a volatile content of between about 4 and 15 percent.

High pressure laminating techniques are employed in preparing the laminates from the above described assembly of core stock layer of core sheets, print sheet and overlay sheet. Temperatures ranging from about 120° C to about 175° C and pressures ranging from about 600 psi. to 2,000 psi. are employed. The time required, at these temperatures, to effect a cure of the resinous components of the assembly will usually be from about 3 minutes to about 25 minutes. The core sheets of the laminate of this invention will each consist essentially of cotton linters paper impregnated with cured phenolic resin. The resulting laminate is generally allowed to cool to between about 50° C to 85° C before being removed from the press. The cooling step generally takes between about 30 to 90 minutes. Generally, the assembly will require a 15 to 45 minute warm up period before the 120° C to 175° C maximum curing temperatures are reached in the press. The entire cycle of warm up, cure and cooling will vary between 50 to 160 minutes.

EXAMPLE 1

Two sets of laminates were prepared to check the abrasiveness and machinability of wood fiber kraft paper vs. felted cotton linters paper.

For laminate (A), a roll of 117-lb. basis weight saturating kraft paper, about 0.01 inch thick, was treated with a solution of phenol formaldehyde resin, to give a resin content of between about 30 and 40 weight percent, and then dried to a stage at which the resin was only partly cured and had a volatile content of between about 6 and 9 weight percent. Equal size partly cured impregnated core sheets 12 × 18 inches in size were cut from the roll and assembled in stacks of 7 sheets to form core stock layers. The layers were placed between release sheets in a press and molded at 1200 psi. and about 150° C, to form 1/16 inch laminates, which were then cooled and removed from the press.

For laminate (B), a roll of 125-lb. basis weight random felted 100% cotton linter fiber paper, 0.015 inch thick, made from fibers between about 18 mm. long, and about 0.010 mm. to about 0.040 mm. in diameter was treated with a solution of phenol formaldehyde resin, to give a resin content of between about 30 and 40 weight percent, and then dried to a stage at which the resin was only partly cured and had a volatile content of between about 6 and 9 weight percent. Equal size partly cured impregnated core sheets 12 × 18 inches in size were cut from the roll and assembled in stacks of 7 sheets to form core stock layers. The layers were placed between release sheets in a press and molded at 1200 psi. and about 150° C to form 1/16 inch laminates, which were then cooled and removed from the press.

A machinability test was run on a stack of 12 × 18 inch samples of the laminates. Each laminate sample was separated from another by an easily machinable ⅛ inch Luan veneer separator. The stack consisted of: Luan separator, laminate (B) core, Luan separator, laminate (A) core, Luan separator, laminate (B) core, Luan separator, laminate (A) core, Luan separator, laminate (B) core, Luan separator, laminate (A) core, and Luan separator. The stack was placed edgewise in a guide, so that one 18 inch edge surface of the stack could be machine cut and shaved by the flat edge of a shaper blade. The stack of separators and laminates was simultaneously machined on a shaper employing a three inch shaper blade head with a welded carbide tip.

The blade was supplied by Lineberry Foundry under the number 32278 and had a tungsten carbide grade tip, with a high cobalt binder content, manufactured by Kennametal Corp. The "soft" carbide tip had a K-1 hardness, corresponding to a 90.0 Rockwell A hardness value. Feeding the sample stack at a moderate speed, about 0.030 to 0.035 inch was removed from the stack edge at each pass. After 500 passes, the carbide tip was examined at 10x magnification. It was relatively simple to identify portions of the blade tip with specific laminate samples because the Luan separators gave no observable wear. Laminates having a core of the 100% cotton linters fiber paper machined much easier than laminates having a core of saturating kraft paper. The samples of laminate (B) cores (cotton linters fiber paper) did not dull or have an abrasive effect on the blade, or cause any cratering, i.e., curved indentation of the blade, although a slight gum build-up on th blade was noted. The samples of laminate (A) cores (kraft paper) showed cratering and a slight dulling of the blade. The sample (B) laminates showed a substantial improvement in machinability without blade dulling over the sample (A) laminates, and possessed the property of being highly machinable. The relatively high lignin content in the kraft paper laminates is thought to provide an insulating effect and keep the blade hot, contributing toward dulling and cratering.

EXAMPLE 2

A build-up of a laminating assembly was prepared as described below: a roll of 125-lb. basis weight 100% cotton linters paper, 0.015 inch thick, made from fibers between about 10 mm. and 40 mm. long and about 0.010 mm. to about 0.040 mm. in diameter was treated with a solution of phenol formaldehyde resin, to give a resin content of between about 30 and 40 weight percent, and then dried to a stage at which the resin was only partly cured and had a volatile content of between about 6 and 9 weight percent. Equal size partly cured impregnated core sheets, 24 × 18 inches were cut from the roll and assembled in stacks of seven sheets to form core stock layers.

A release sheet was placed on the bottom plate of a press surface followed by the above-described core stock layer. A wood grained, resin impregnated, cured print sheet was placed on the core stock layer followed by a clear, resin impregnated cured overlay sheet. The print and overlay comprised 24 × 18 inch sheets of alpha cellulose paper impregnated with melamine-formaldehyde resin. The melamine-formaldehyde resin content of the print and overlay sheets prior to drying was between about 35 and 45 weight percent, and after curing they had a volatile content of between about 3.5 and 5 weight percent. A release sheet was then superimposed on the overlay sheet.

The press was then closed against the laminate lay up, which was molded at 1200 psi and about 150° C. The assembly was heated in the press for a total of about 35 minutes, i.e., about 20 minutes was required for warm-up after placing the laminating assembly in the press and 15 minutes was required at the maximum internal temperature. Then the lay up was allowed to cool for about 45 minutes until the assembly reached a temperature of 70° to 80° C, after which it was taken from the press. Consolidated, strongly bonded decorative laminates were produced.

These wood patterned, decorative laminates, were then cut to fit on the top of the flat surface of ⅜ inch thick, 36 inches long, curved, wood bound chipboard. They were then glued onto the chipboard surface. This provided a decorative laminate top, and a wood edge, for the chipboard base. The assemlby at this point had a 90° square corner surface. The entire assembly was to be used as the top of one side of a leaf table. The 36 inch curved wood, and the edge of the top decorative laminate were then machine shaped, to form a rounded corner surface on the table. About 250 edge cuttings of these assemblies could be made on cotton linters paper core type top lamintes per "soft" carbide tipped shaper blade; whereas only about 40 of these edge cuttings could be made on saturating kraft paper core type top laminates per "soft" carbide tipped shaper blade.

The melamine formaldehyde and phenol formaldehyde impregnating resins used above to impregnate the overlay, print and core stock papers were prepared as follows:

To 1,620 lb. (20 moles) of a 37 percent formaldehyde solution with a pH adjusted to about 7.5 with sodium hydroxide was added 1,260 lb. (10 moles) of recrystallized melamine. The mixture was heated to reflux and then cooled to 60° to 65° C. Then the following materials were added in order: 200 lb. of ethyl alcohol, 140 lb. of o,p-toluene sulfonamide and 186 lb. of methylglucoside. Mixing was continued to complete solution. Finally 734 lbs. of water was added.

To 940 lb. (10 moles) of molten phenol was added 1,012 lb. (12.5 moles) of 37 percent formaldehyde solution. To this was added a sodium hydroxide solution containing 15 lb. (0.375 mole) of sodium hydroxide flakes dissolved in 30 lb. of water. The mixture was reacted at 98° C reflux and then diluted with methyl alcohol.

We claim:

1. A consolidated, unitary decorative assembly, comprising a decorative laminate, the decorative laminate having a machined surface, said decorative laminate comprising a non-abrasive, shapeable base core of a plurality of sheets, each sheet consisting of paper consisting of cotton linter fibers in felted form having lengths between about 5 mm. and about 40 mm. and diameters between about 0.010 mm. and about 0.040 mm., impreganted with a cured phenolic resin, the base core having the property of allowing machine cutting for 500 cycles per 1½' of core edge surface without cratering a 90.0 Rockwell A hardness carbide tipped shaper blade, said core having superimposed thereon a decorative print sheet impregnated with a cured thermoset resin, and an outer protective overlay sheet impregnated with a cured thermoset resin.

2. The decorative assembly of claim 1 wherein the thermoset resin in the print and overlay is an amino triazine aldehyde resin.

3. The decorative assembly of claim 1 wherein the cotton linter paper is in random felted form and has a thickness of from about 0.010 inch to about 0.025 inch.

4. The decorative assembly of claim 2 wherein the print sheet and overlay sheet are selected from the group consisting of alpha cellulose paper and regenerated cellulose paper.

* * * * *